United States Patent [19]
Andree et al.

[11] 3,874,105
[45] Apr. 1, 1975

[54] AUTOMATIC FISH-HOOKING DEVICE

[76] Inventors: Robert T. Andree, 1150 Altadena Ave.; Horst R. Hickmann, 1455 Montegor Dr., both of Cincinnati, Ohio 45230

[22] Filed: July 30, 1973

[21] Appl. No.: 384,112

[52] U.S. Cl. ............................................. 43/15
[51] Int. Cl. ............................................ A01k 97/10
[58] Field of Search ............................. 43/15, 16

[56] References Cited
UNITED STATES PATENTS

| | | | |
|---|---|---|---|
| 2,657,492 | 11/1953 | Skorr | 43/15 |
| 2,804,277 | 8/1957 | Kinder | 43/16 |
| 2,908,099 | 10/1959 | Burke | 43/16 |
| 3,154,875 | 11/1964 | Biddison | 43/15 |
| 3,284,943 | 11/1966 | Wedel | 43/15 |

*Primary Examiner*—Warner H. Camp
*Attorney, Agent, or Firm*—Irwin P. Garfinkle

[57] ABSTRACT

An automatic fish-hooking device including a base that is adjustably secured to a horizontal or vertical surface. A frame pivoted to the base supports a fishing rod between an integral forked end and a V-channel element extending from the frame. A quick release hook on the frame positively holds the fishing rod until it is released. A spring urges the frame away from the base and an adjustable latch holds the base and frame in a cocked position. When a fish takes the bait on the line the latch is disengaged and the spring snaps the frame to a released position to hook the fish.

8 Claims, 5 Drawing Figures

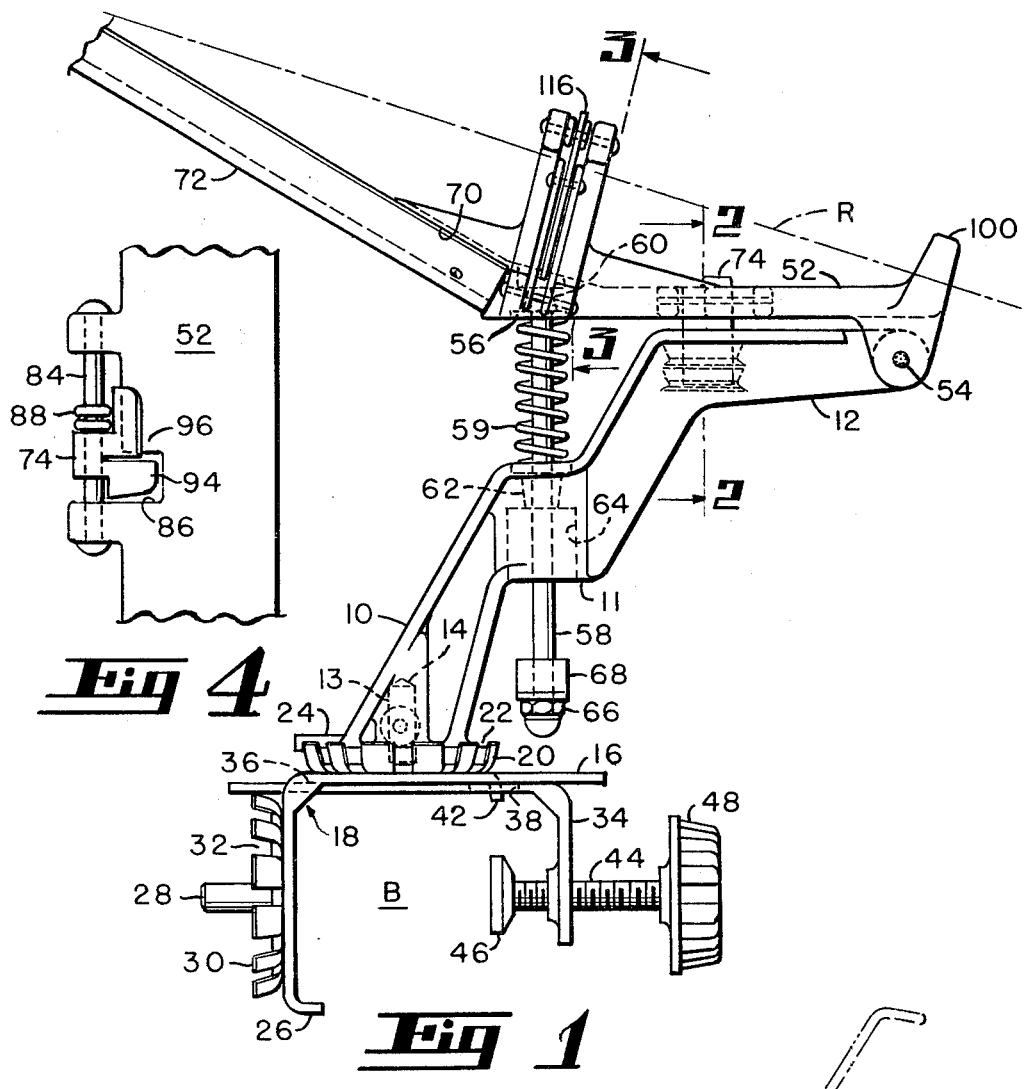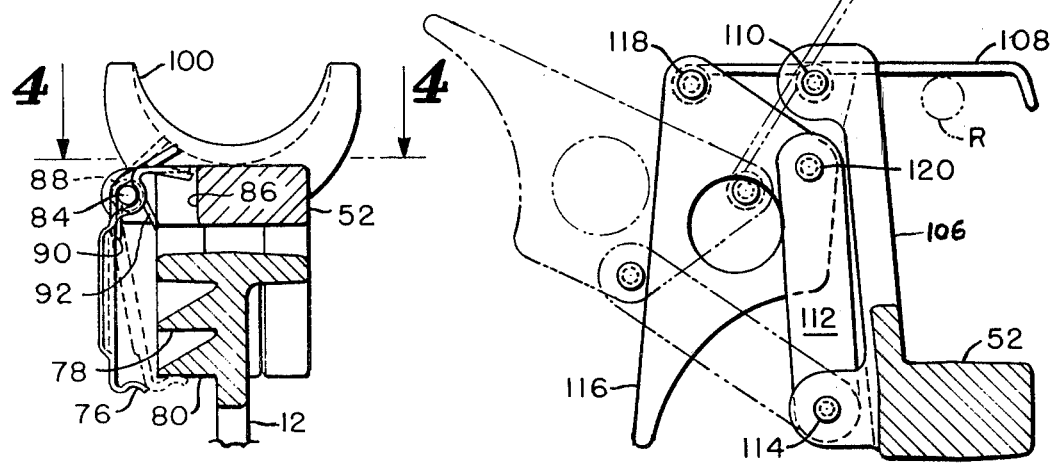

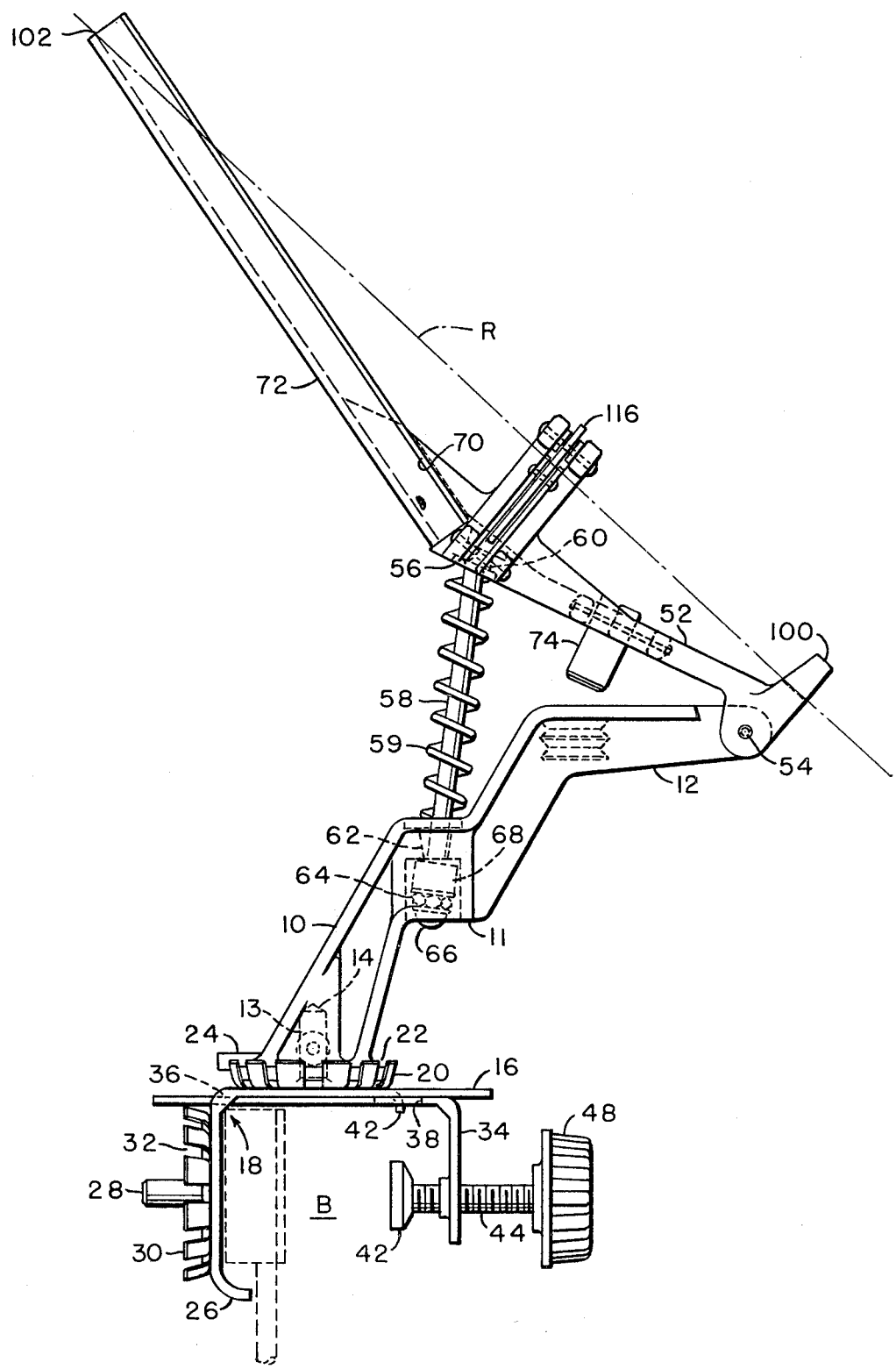

AUTOMATIC FISH-HOOKING DEVICE

The present invention relates to fishing rod holders and more particularly to the type in which a rod is automatically raised in response to a fish taking the bait on the line.

There have been many attempts to provide fishing rod holders of the automatic type that swing a rod to an up position to snag a fish on a hook. Generally speaking, this type of fishing rod holder comprises a pair of elements pivoted to one another and urged apart by a spring or other device. A latch on one connects with the other to hold them in a cocked position. When an increase in line tension is sensed, either through the line directly or through the rod, the latch releases and the spring snaps the elements apart to snag a fish. Typical examples of this type of device may be found in the U.S. Pat. to Wedel, No. 3,284,943, Pack, No. 3,293,789, and McDonnell, No. 3,660,921.

There are two common difficulties with all of these prior art devices. The first is that the prior art devices do not have a quick release mechanism that permits the rod to be positively held until the device is released and then easily and quickly removed. Some of these devices hold the rod by spring clips which do not positively hold the rod in place. When it is necessary to remove the rod a significant force must be exerted to free the rod from the spring clips, thus delaying the point at which a fisherman can quickly reel in or play a fish. Other devices simply hold a rod in the end of a tube. This provides quick removal but lacks a positive support for the cocked position.

Another problem is that the prior art devices do not have sufficient adjustability to permit the selection of a different line tension to trigger the device.

These ends are achieved in one aspect of the present invention by a fishing rod holder comprising a rod-holding frame pivotally mounted to the base and urged apart to a released position. An adjustable latch holds the elements in a cocked position and is responsive to a predetermined force on the rod to be released and permit the frame to be snapped to the released position. Spaced forked supports on the frame receive a rod. A means intermediate the supports releasably holds the rod in place.

The above and other related features of the present invention will be apparent from a reading of the following description of the disclosure shown in the accompanying drawings and the novelty thereof pointed out in the appended claims.

In the drawings:

FIG. 1 is an elevational view of a fishing rod holder embodying the present invention, shown in a cocked position;

FIG. 2 is a cross-sectional view of FIG. 1 taken on line 2—2 of FIG. 1;

FIG. 3 is another cross-sectional view of the holder of FIG. 1 taken on line 3—3 of FIG. 1;

FIG. 4 is a fragmentary section view taken on line 4—4 of FIG. 2; and

FIG. 5 is an elevational view of the fishing rod holder of FIG. 1, shown in a released position.

FIG. 1 shows an automatic fish-hooking device comprising a cast pedestal 10 with an integral step 11 and base element 12. A vertical bore 13 in the bottom of pedestal 10 is received over a rod 14 secured to one leg 16 of an L-shaped plate 18. A cup 20 with notches 2 surrounds rod 14. An arm 24, pivotally secured to pedestal 10, is received in any one of the notches 22 to preposition the pedestal 10 relative to the plate 18. The plate 18 has a second leg 26 at a right angle to leg 16 with a similar rod 28 surrounded by cup 30 having a plurality of notches 32. An L-shaped plate 34 is slidable in a slot 36 at the junction of legs 16 and 26 of plate 18. The leg 16 of plate 18 has a tab 42 that is received in one of a plurality of slots 38 in L-shaped element 34 to position it relative to leg 16. L-shaped plate 34 has a shaft 44 threadedly engaging it. Shaft 44 has a swivel cap 46 at one end for clamping to the side of a boat, pier, dock, or bridge, or other fixed object, between cap 46 and leg 26. A handle 48 is secured to the opposite end of shaft 44.

A cast rod support frame element 52 is pivotally connected at one end to base 12 by a shaft 54. Frame 52 has a bore 56 at one end which receives a cap 60 of a guide rod 58. Guide rod 58 extends through a bore 62 and a cylindrical recess 64 in the step 11. A resilient sleeve, or shock absorber, 68 is received over the lower end of guide rod 58 and is held in place by a nut 66. Frame 52 has a V-shaped recess 70 which receives a V-shaped channel element 72.

A spring 59 surrounding guide rod 58 urges the frame 52 away from the base 12 and the two are held in the cocked position of FIG. 1 by a latch 74, shown particularly in FIGS. 2 and 4. Latch 74 is pivotally mounted over a shaft 84 which is received in opposite walls of a recess 86 in frame 52. A torsion spring 88 is wrapped around shaft 84 and has a first end 90 acting on latch 74 and a second end 92 acting on frame 52. This urges a hooked end 76 of latch 74 away from one of a pair of recesses 78 or on the bottom face 80 of base 12. As explained later, there is sufficient friction between the hooked end 76 of latch 74 and the recesses 78 or surface 80 caused by spring 59 to prevent spring 88 from swinging latch 74 out of engagement with base 12.

The latch 74 has a tab 94 extending from its upper end. When the latch 74 is in the position illustrated in FIGS. 2 and 4, the tab 94 is free to swing through the recess 86. When latch 74 is moved axially along shaft 84 the tab 94 abuts a shoulder 96 which prevents downward movement, thus locking latch 74 in place.

The cast frame element 52 has an integral forked end 100 which forms a fork support for a rod illustrated in phantom as R. The end of the V-channel element 72 forms a second spaced forked support 102 for the rod R (see FIG. 5). A quick-release hook mechanism, particularly shown in FIG. 3, is positioned intermediate supports 102 and 100. The quick-release hook device comprises a post 106 integral with and extending upward from frame 52. A hook element 108 is pivotally secured to the upper end of post 106 through a shaft 110. A link 112 is pivotally secured to frame 52 at a connection 114. An operator-manipulated plate 116 is pivotally connected to an end 118 of the hook 108 and to the link 112 at 120. The operator-manipulated plate is displaceable from the illustrated position wherein it is substantiallly vertical to a released position shown in phantom where it permits the hook 108 to swing away from the rod R. As later described, the distance between the connection 120 and 114, plus the distance between 120 and 118, is greater than the distance between the connection 114 and 118 for the hook 108 to be in its holding position of FIG. 3 so that an over center action results.

In operation the fishing rod holder is clamped to the side of a boat B, as illustrated in FIG. 1. It may also be connected to a seat or other member by clamping frame 18 to a horizontal surface so that post 28 is vertical and then placing the pedestal 10 over post 28. Whichever mounting position is selected, the arm 24 is dropped into the appropriate notch 22 or 32 to maintain a desired orientation of the rod holder relative to the boat. Alternatively, the arm 24 may be positioned out of the notch to permit the pedestal to swivel and take into account boat, fish or current movements. Frame 52 is then pushed toward base 12 against the action spring 59 and latch 74 is placed in one of the two recesses 78 or the bottom surface 80 of the base 12, depending upon the particular tension desired. The lower the notch the more tension on the line or rod is required to release the latch and set a hook firmly in the jaw of a fish.

With the frame 52 in the cocked position a line is sent out and the fishing rod simply placed on the forked supports 100, 102. Plate 116 is swung to its position illustrated in FIG. 3 where it releasably holds rod R in place.

When a fish bites, the line tension on the rod R tends to pull support 102 in a direction urging frame 52 and base 12 toward one another. When this is done the hooked end of latch 74 is pushed free of the recesses 78 or 80 by spring 88 and the spring 59 pushes on frame 52 to snap it away from the base 12. The resilient sleeve 68, or shock absorber, cushions the upward movement of frame 52. This action hooks the fish and the rod is removed from the holder by swinging operator-manipulated lever 116 upward to the phantom position of FIG. 3 to swing the hook 108 away from the rod. The rod is simply removed by pulling it out of the forked supports 100, 102. This greatly simplifies the process of removing the rod from the holder so that a fish may be quickly retrieved before it has a chance to free itself from the hook.

The above latch mechanism enables a rapid and accurate preselection of the line tension required to trigger the mechanism. Alternatively, the latch 74 may be placed in its locked position over the shoulder 96 if an operator wishes to use the rod for trolling. This prevents the holder from releasing because of variations in tension on the line as it is pulled through the water.

While a preferred embodiment of the present invention has been disclosed it should be apparent to those skilled in the art that it may be practiced in other forms without departing from its spirit and scope.

Having thus described the invention what is claimed as novel and desired to be secured by Letters Patent of the United States is:

1. An automatic fish-hooking device comprising:
first and second elements pivotally secured to one another and being pivotal between a cocked position closely adjacent to one another and a released position where they are pivoted away from one another, said first element forming a base and having a pair of spaced forked supports for resting a fishing rod;
means on said second element intermediate said forked supports for releasably urging said fishing rod in place against both forked supports;
a guide rod mounted on one of said elements and extending through a bore in the other element;
an element urging means comprising a compression spring surrounding said guide rod and acting against said first and second elements for yieldably urging said elements toward said released position;
a latch pivotally mounted on one of said elements, the other of said elements having at least one recess receiving said latch to hold said elements in the cocked position, said latch being positioned between said pivotal mounting of said elements and said guide rod;
means for yieldably urging said latch out of said recess, the friction between said latch and said recess being sufficient when said elements are in said cocked position to prevent said latch-urging means from displacing the latch out of said recess except when said elements are pivoted toward one another from said cocked position; and
means on said guide rod for limiting displacement of said elements away from one another.

2. An automatic fish-hooking device comprising:
first and second elements pivotally secured to one another and being pivotal between a cocked position closely adjacent to one another and a released position where they are pivoted away from one another, said first element forming a base and having a pair of spaced forked supports for resting a fishing rod;
means on said second element intermediate said forked supports for releasably urging said fishing rod in place against both forked supports;
a guide rod mounted on one of said elements and extending through a bore in the other element;
an element urging means comprising a compression spring surrounding said guide rod and acting against said first and second elements for yieldably urging said elements toward said released position;
a latch pivotally mounted on one of said elements, the other of said elements having a plurality of recesses for receiving said latch to hold said elements in the cocked position, said plurality of recesses permitting a variation in said cocked position, thereby varying the force necessary to release said elements, said latch being positioned between said pivotal mounting of said elements and said guide rod; and
means for yieldably urging said latch out of said recess, the friction between said latch and said recess being sufficient when said elements are in said cocked position to prevent said latch-urging means from displacing the latch out of said recess except when said elements are pivoted toward one another from said cocked position, said latch-urging means comprising a torsion spring acting about the pivotal mount of said latch for pivoting it out of said recess.

3. Apparatus as in claim 2 wherein:
said latch further comprises a tab extending radially with respect to the pivotal mounting thereof;
the element on which said latch is mounted has a recess permitting pivoting of said latch out of the recess on the other of said elements and a shoulder adjacent said recess for preventing movement of said tab in a direction permitting said latch to pivot out of said recess, said latch being slidable axially relative to its pivotal mounting so that said tab abuts said shoulder and locks said latch in said recess.

4. An automatic fish-hooking device comprising:
first and second elements pivotally secured to one another and pivotal between a cocked position closely adjacent one another and a released position where they are pivoted away from one another, said first element forming a base and the second having a pair of spaced forked supports for resting a fishing rod;
means on said second element intermediate said forked supports for releasably urging said fishing rod in place against both forked supports;
means for yieldably urging said elements toward said released position;
a latch pivotally mounted one one of said elements, the other of said elements having at least one recess receiving said latch to hold said elements in the cocked position, said second element further comprising a post extending at least to a line drawn between the forked mounting points; and
said releasable urging means comprising:
a hook element pivotally mounted to said post and having a first hooked end adapted to be placed over a fishing pole and a second end extending beyond said pivotal mounting point;
an operator-manipulated plate pivotally mounted to said second element adjacent said post;
a link pivotally mounted to the second end of said hook element and to said operator-manipulated plate, the length between the pivotal mounting points of said link and between the pivotal mounting points of said plate being greater than the distance between the pivotal mounting point on said other element and said second end for the position in which the hook element holds the pole in place, thereby releasably holding said hook element through an over-center system.

5. Apparatus as in claim 4 wherein one of said forked supports comprises an elongated V-channel element extending from said second element in a direction in which the longitudinal axis of said channel element defines an acute angle with respect to said fishing pole.

6. Apparatus as in claim 5 wherein said second element comprises:
a cast element pivotally mounted to said one element, a guide shaft for said yieldably urging means being mounted to said cast element at a point spaced from said pivotal mounting and said channel element extending from said cast element adjacent said guide shaft; and
the other of said forked supports being integral and extending from said cast element adjacent said pivotal mounting.

7. An automatic fish-hooking device comprising:
first and second elements pivotally secured to one another and pivotal between a cocked position closely adjacent one another and a released position where they are pivoted away from one another, said first element forming a base and the second having a pair of spaced forked supports for resting a fishing rod;
means on said second element intermediate said forked supports for releasably urging said fishing rod in place against both forked supports;
means for yieldably urging said elements toward said released position;
a latch pivotally mounted on one of said elements, the other of said elements having at least one recess receiving said latch to hold said elements in the cocked position;
means for yieldably urging said latch out of said recess, the friction between said latch and said recess being sufficient when said elements are in said cocked position to prevent said latch-urging means from displacing the latch out of said recess except when said elements are pivoted toward one another from said cocked position; and
means for releasably mounting said first element to a fixed base in a plurality of positions, said releasable means comprising:
a C-clamp having two surfaces at right angles to one another;
a post extending at a right angle from each of said surfaces;
a cup surrounding each post, said cup having a plurality of notches in its periphery;
a pedestal extending from said first element and having a bore permitting said pedestal to be placed over said post; and
an arm pivotally mounted to said pedestal to be received in one of said notches to maintain the position of said pedestal relative to said C-clamp.

8. Apparatus as in claim 7 wherein said C-clamp comprises:
a first L-shaped plate forming said two surfaces, said plate having a slot adjacent the bend in said plate;
a second L-shaped plate having a first leg adjustably received in said slot;
a shaft threaded into the second leg of said second L-shaped plate for clamping between said first and second L-shaped plates.

* * * * *

UNITED STATES PATENT OFFICE
CERTIFICATE OF CORRECTION

PATENT NO. : 3,874,105
DATED : April 1, 1975
INVENTOR(S) : Robert T. Andree et al It is certified that error appears in the above-identified patent and that said Letters Patent are hereby corrected as shown below:

Col. 1, last line, "notches 2" should read -- notches 22 -- .

Col. 3, line 13, "action spring 59" should read

-- action of spring 59 -- .

Signed and sealed this 17th day of June 1975.

(SEAL)
Attest:

RUTH C. MASON
Attesting Officer

C. MARSHALL DANN
Commissioner of Patents
and Trademarks